(12) United States Patent
Aaron

(10) Patent No.: US 8,787,884 B2
(45) Date of Patent: Jul. 22, 2014

(54) ADVERTISEMENTS FOR MOBILE COMMUNICATIONS DEVICES VIA PRE-POSITIONED ADVERTISEMENT COMPONENTS

(75) Inventor: Jeffrey Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1074 days.

(21) Appl. No.: 11/627,269

(22) Filed: Jan. 25, 2007

(65) Prior Publication Data

US 2008/0182588 A1 Jul. 31, 2008

(51) Int. Cl.
*H04M 3/42* (2006.01)

(52) U.S. Cl.
USPC .................................. 455/414.1; 455/456.1

(58) Field of Classification Search
USPC ............................ 455/456.1, 414.1
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 5,812,932 A | 9/1998 | Wiedeman et al. | |
| 6,130,707 A | 10/2000 | Koller et al. | |
| 6,567,835 B1 | 5/2003 | Blomgren et al. | |
| 6,580,914 B1 | 6/2003 | Smith | |
| 6,754,665 B1 | 6/2004 | Futagami et al. | |
| 6,853,628 B2 | 2/2005 | Chitrapu | |
| 6,892,217 B1 * | 5/2005 | Hanmann et al. | 709/200 |
| 6,912,398 B1 | 6/2005 | Domnitz | |
| 6,947,976 B1 * | 9/2005 | Devitt et al. | 709/219 |
| 6,977,997 B2 | 12/2005 | Shioda et al. | |
| 7,136,658 B2 | 11/2006 | Cole et al. | |
| 7,136,688 B2 | 11/2006 | Jung et al. | |
| 7,324,959 B2 | 1/2008 | Malkin et al. | |
| 7,356,347 B1 | 4/2008 | Kammer | |
| 7,599,795 B1 | 10/2009 | Blumberg et al. | |
| 7,634,228 B2 | 12/2009 | White et al. | |
| 2002/0082931 A1 | 6/2002 | Siegel et al. | |
| 2002/0095333 A1 | 7/2002 | Jokinen et al. | |
| 2002/0101993 A1 | 8/2002 | Eskin | |
| 2002/0147928 A1 * | 10/2002 | Mahajan et al. | 713/201 |
| 2002/0178385 A1 | 11/2002 | Dent et al. | |
| 2003/0006913 A1 | 1/2003 | Joyce | |
| 2003/0008661 A1 | 1/2003 | Joyce | |
| 2003/0050039 A1 | 3/2003 | Baba et al. | |
| 2003/0060240 A1 | 3/2003 | Graham et al. | |
| 2003/0198204 A1 | 10/2003 | Taneja et al. | |

(Continued)

OTHER PUBLICATIONS

U.S. Appl. No. 11/610,898, filed Dec. 14, 2006.

(Continued)

*Primary Examiner* — Amancio Gonzalez
(74) *Attorney, Agent, or Firm* — Parks IP Law LLC; Jennifer P. Medlin, Esq.

(57) ABSTRACT

Mobile communications devices output advertisements such as by visually displaying them in accordance with an advertisement recipe. The advertisement recipe specifies advertisement components to include in the constructed advertisement and a configuration of those advertisement components. The mobile communications device stores a plurality of advertisement components in advance of receiving the advertisement recipe. An advertisement schedule may be provided that includes timing information to specify when each advertisement of the advertisement recipes is to be provided as output by the mobile communications device. The advertisement recipes may be provided based on a current context such as location of the mobile communications device so that the resulting advertisement being provided as output is relevant to the current context.

20 Claims, 10 Drawing Sheets

(56) References Cited

U.S. PATENT DOCUMENTS

| | | |
|---|---|---|
| 2004/0032503 A1 | 2/2004 | Monden et al. |
| 2004/0082351 A1 | 4/2004 | Westman |
| 2004/0092269 A1 | 5/2004 | Kivinen |
| 2004/0110515 A1 | 6/2004 | Blumberg et al. |
| 2004/0141606 A1 | 7/2004 | Torvinen |
| 2004/0209602 A1 | 10/2004 | Joyce |
| 2005/0073406 A1 | 4/2005 | Easley et al. |
| 2005/0075116 A1 | 4/2005 | Laird et al. |
| 2005/0113123 A1 | 5/2005 | Torvinen |
| 2005/0117516 A1 | 6/2005 | Yang |
| 2005/0149443 A1 | 7/2005 | Torvinen |
| 2005/0153729 A1 | 7/2005 | Logan et al. |
| 2005/0176420 A1 | 8/2005 | Graves et al. |
| 2005/0181824 A1 | 8/2005 | Lloyd |
| 2005/0215238 A1* | 9/2005 | Macaluso ................. 455/414.1 |
| 2005/0221876 A1 | 10/2005 | Van Bosch et al. |
| 2005/0266870 A1 | 12/2005 | Benco et al. |
| 2005/0288038 A1 | 12/2005 | Kim |
| 2006/0009240 A1 | 1/2006 | Katz |
| 2006/0015404 A1* | 1/2006 | Tran ................................. 705/14 |
| 2006/0033625 A1 | 2/2006 | Johnson et al. |
| 2006/0047573 A1 | 3/2006 | Mitchell et al. |
| 2006/0089158 A1 | 4/2006 | Lai et al. |
| 2006/0095540 A1 | 5/2006 | Anderson et al. |
| 2006/0178932 A1 | 8/2006 | Lang |
| 2006/0194595 A1 | 8/2006 | Myllynen et al. |
| 2006/0224863 A1 | 10/2006 | Lovett et al. |
| 2006/0253453 A1* | 11/2006 | Chmaytelli et al. ............ 707/10 |
| 2007/0004393 A1 | 1/2007 | Forsberg et al. |
| 2007/0037561 A1 | 2/2007 | Bowen et al. |
| 2007/0037605 A1 | 2/2007 | Logan |
| 2007/0054687 A1 | 3/2007 | Akita et al. |
| 2007/0136796 A1 | 6/2007 | Sanchez et al. |
| 2007/0182818 A1 | 8/2007 | Buehler |
| 2007/0232342 A1 | 10/2007 | Larocca |
| 2007/0287379 A1 | 12/2007 | Matsuura et al. |
| 2008/0004951 A1 | 1/2008 | Huang et al. |
| 2008/0032677 A1 | 2/2008 | Catovic et al. |
| 2008/0045236 A1 | 2/2008 | Nahon et al. |
| 2008/0052169 A1 | 2/2008 | O'Shea et al. |
| 2008/0114778 A1 | 5/2008 | Siegel |
| 2008/0182563 A1 | 7/2008 | Wugofski et al. |
| 2008/0182586 A1 | 7/2008 | Aaron |
| 2008/0215415 A1* | 9/2008 | Willms ........................... 705/10 |
| 2008/0268895 A1 | 10/2008 | Foxenland |
| 2009/0176524 A1 | 7/2009 | David |

OTHER PUBLICATIONS

U.S. Appl. No. 11/843,954, filed Aug. 23, 2007.
U.S. Appl. No. 11/611,345, filed Dec. 15, 2006.
U.S. Appl. No. 11/610,890, filed Dec. 14, 2006.
U.S. Appl. No. 11/680,898, filed Dec. 14, 2006.
U.S. Appl. No. 11/611,434, filed Dec. 15, 2006.
U.S. Appl. No. 11/610,927, filed Dec. 14, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/668,848, filed Jan. 30, 2007.
Helio GPS-powered Buddy Beacon, http://www.helio.com, date unknown, believed to exist before filing of the present application.
GPS Locator Phone, http://www.wherify.com/wherifone/kids.html?page-kids, copyright 2006, believed to exist before filing of the present application.
Dodgeball.com bringing your phone to life. http://www.dodgeball.com , copyright 2006, believed to exist before filing of the present application.
OnStar Technology, http://www.onstar.com/US_english/jsp/explore/onstar_basics/technology.jsp, copyright 2006, believed to exist before filing of the present application.
Leopold et al. "Bluetooth and Sensor Networks: A Reality Check"; SenSys '03 (Nov. 2003).
Palo Wireless "K1-Generic Access Profile", http://www.palowireless.com/infotooth/tutorial/kl_gap.asp (2004).
Huang et al, "A Self-Adaptive Zone Routing Protocol for Bluetooth Scatternets", Computer Communications; v28:1:37-50 (Jan. 2005).
Aalto et al., "Bluetooth and WAP Push Based Location-Aware Mobile Advertising System", MobiSys 04 (Jun. 2004).
Woodings at al., "Rapid Heterogeneous Connection Establishment: Accelerating Bluetooth Inquiry Using IrDA" Wireless Communications and Networking Conference (2002).
Huang, "Adaptive Zone Routing Protocol for Bluetooth Scatternets" pp. 1-16 (Aug. 26, 2004).
Woodings, "Rapid Heterogeneous ad hoc connection establishment. Accelerating Bluetooth inquiry using IrDA", Wireless Comm & Networks Conf (2002) abstract only.

* cited by examiner

ADVERTISEMENTS FOR MOBILE COMMUNICATIONS DEVICES VIA PRE-POSITIONED ADVERTISEMENT COMPONENTS

TECHNICAL FIELD

Embodiments are directed to providing advertisements via mobile communications devices. More particularly, the embodiments are directed to providing advertisements by pre-positioning advertising components at the mobile communications device.

BACKGROUND

Mobile communications devices, such as cellular telephones and PDAs, are becoming ubiquitous, and use of such devices has become a normal part of daily life for many individuals. The mobile communications device is often carried by individuals at most hours of the day as they travel from place to place. During this time, the mobile communications device is a primary manner of conveying information to the user. Advertisements are one example of information that can be conveyed.

There are several drawbacks with providing advertisements to mobile communications devices. One problem is that bandwidth downstream to the mobile communications device from a mobile communication network is usually limited so that advertisements cannot be transferred very often or very quickly. As a result of this issue, the advertisement is typically repeated rather than transferring new content to the mobile communications device.

It has been found that as a general conclusion, users of mobile communications devices dislike repeated advertisements and may ignore them or even become frustrated when seeing the same advertisement more than once, especially within a short span of time. Furthermore, the advertisements may be provided by the mobile communications device while having no particular relevance to the present context for the user. Repeatedly viewing the same irrelevant advertisement creates further discontent.

SUMMARY

Embodiments address these issues and others by providing components of advertisements to the mobile communications device in advance of outputting advertisements by the mobile communications device. Then, advertisement recipes may be transferred to the mobile communications device to instruct the mobile communications device to build advertisements from the components that have been previously received. The recipe may vary each time so that the resulting advertisement is not being repeated. Furthermore, the recipe may be provided based on a known location of the mobile communications device so that the resulting advertisement is relevant to the present context for the user.

Embodiments provide a method of displaying advertisements on a mobile communications device that stores a plurality of advertisement components. The method involves determining an advertisement recipe to send to the mobile communications device. The method further involves sending to the mobile communications device the determined advertisement recipe which specifies a portion of the components and a configuration for the components to include in an advertisement.

Embodiments provide a computer readable medium containing instructions that perform acts that involve storing a plurality of advertisement components at a mobile communications device. After storing the plurality of advertisement components, the mobile communications device receives an advertisement recipe from an external device, the advertisement recipe specifying a portion of the plurality of advertisement components and a configuration of the specified advertisement components. The portion of the plurality of advertisement components are accessed at the mobile communications device, and the advertisement that corresponds to the advertisement recipe is provided at the mobile communications device.

Embodiments provide a mobile communications device that includes a transceiver that communicates with a mobile communication network and a memory storing a plurality of advertising components. The mobile communications device also includes an output device and a processor that receives an advertisement recipe via the transceiver. The advertisement recipe specifies advertising components and a configuration of the advertising components. The processor creates an advertisement and provides the advertisement on the output device by accessing from memory the advertising components specified by the advertisement recipe and arranging them in accordance with the configuration of the advertisement recipe.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide advertisements to users of mobile communications devices by the mobile communications device constructing advertisements from advertisement components stored by the mobile communications device. Advertisement recipes are transferred to the mobile communications device to specify which advertisement components are used in a given advertisement and in what configuration. Furthermore, a schedule may be transferred to the mobile communications device to specify timing for the outputting of the constructed advertisements. The advertisement components are stored by the phone in advance of receiving the advertisement recipes such that relatively little bandwidth is needed to trigger the outputting of the advertisement at the mobile communications device.

Figure 1:
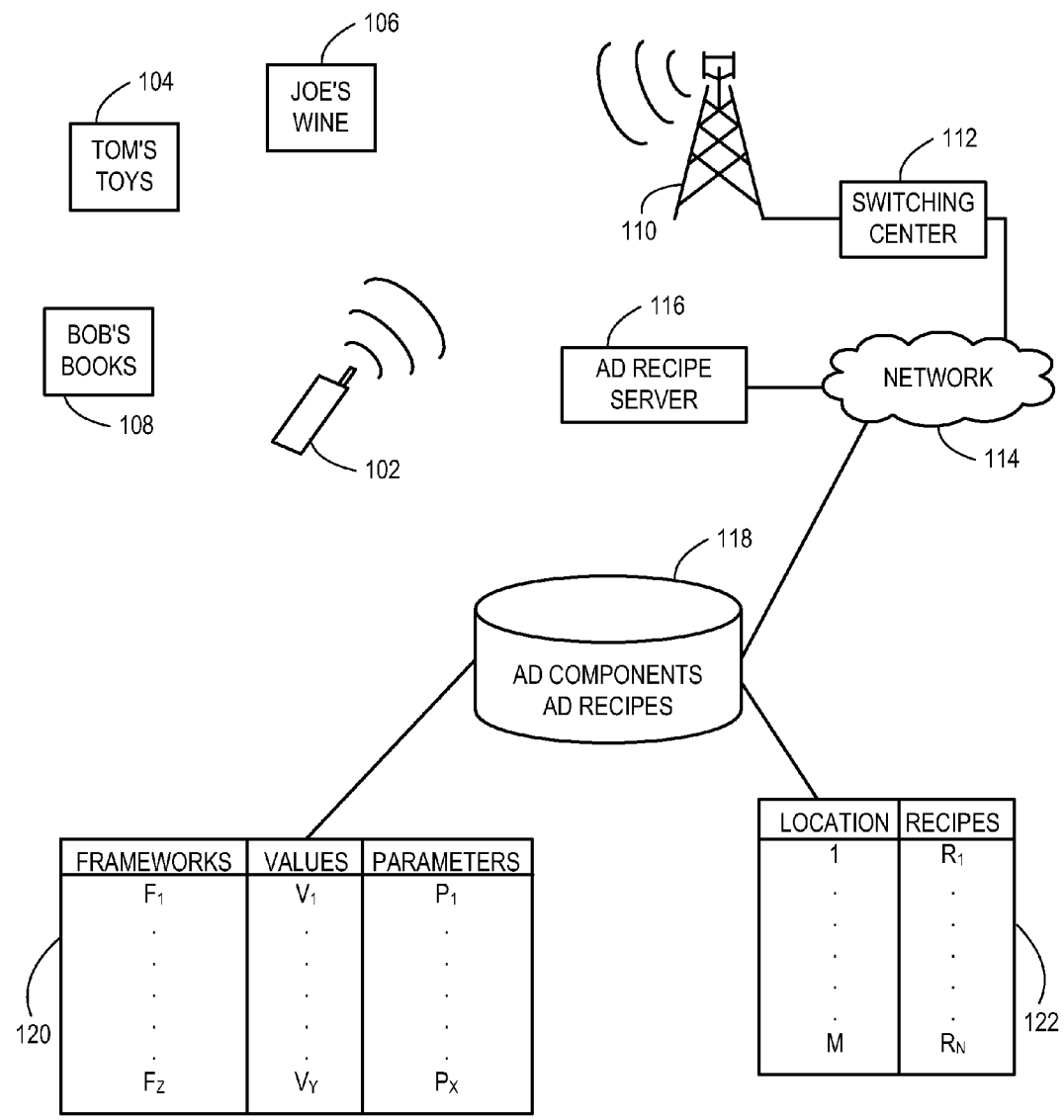
FIG. 1 shows an example of a mobile communications device in communication with a mobile communications network that provides advertisement components and recipes.

FIG. 1 shows a mobile communications device 102 in communication with a mobile communications network that includes a base station 110 and a switching center 112. The mobile communications device 102 communicates wirelessly with the base station 110 in order to send and receive data. Furthermore, according to various embodiments, the mobile communications device 102 may also conduct voice communications such as where the mobile communications device 102 is a cellular phone or other mobile device capable of voice calls. The mobile communications device 102 may be of various forms such as a cellular phone including analog and digital phones, PDAs, and the like.

The mobile communications device 102 provides advertisements as output to the user by constructing the advertisements from advertisement components that have been stored in advance. For example, the mobile communications device 102 may be manufactured with a default set of advertisement components already stored. Additionally, the mobile communications device 102 may receive updates to the advertisement components from time to time, either by receiving an automatic download or by periodically generating a request for an update.

A table 120 illustrates one example of the storage of the advertisement components stored in advance by the mobile communications device 102. Advertising components may include such information as frameworks, values, and parameters. According to exemplary embodiments, frameworks are the structure of the advertisement, such as the background and the border, and these frameworks dictate the overall size and shape of the advertisement to be constructed. Values are the words, symbols, photographs, and other content that are positioned within the framework to create the advertisement. Parameters are effects applied to the framework and/or values specified for an advertisement. Examples of parameters include scaling of size of the value relative to a default, blinking, wiggling, rotating, and positioning.

The mobile communications device 102 may receive an advertisement recipe from an external system such as a server accessed through the mobile communications network at or near the time to construct and output the corresponding advertisement. Because the advertisement recipe is a set of instructions rather than advertising content, the advertisement recipe requires relatively little bandwidth and can be sent to the mobile communications device 102 at virtually any time that an advertisement is needed.

The switching center 112 of the mobile communications network may be linked to the data network 114 which may be a public network such as the Internet or an intranet or other private data network. The network 114 may operate using standard communication protocols to allow the mobile communications device 102 to exchange data with external devices such as an advertisement recipe server 116 as well as an advertisement database 118.

The advertisement recipe server 116 may periodically update the advertisement components stored by the mobile communications device 102. For example, the server 116 may send components downstream to the mobile communications device 102 during periods of inactivity or alternatively, upon receiving a request from the device 102 for the update. Note that the server 116 may also trickle components to the mobile device 102 during periods when the mobile device 102 is only lightly using the communications channel. For instance, the trickling may be done when the mobile device 102 is utilizing a percentage of the available communications bandwidth below a threshold, or when the mobile device 102 is utilizing the available communications channel in a manner such that receiving the plurality of advertisement components will not significantly interfere with extant communications already in progress (i.e., those extant communications can complete without failure and without user-perceivable degradation to the service). Rules may be used by the mobile device 102 and/or the server 116 to determine when either of these "light use" conditions, or similar conditions, occur.

The advertisement database 118 may include advertisement components and advertisement recipes. The advertisement components are building blocks that the mobile communications device 102 may use to construct an advertisement. The database 118 may store the advertisement components in a form such as shown in the table 120.

In addition to storing advertisement components, the database 118 may also store advertisement recipes in association with geographic locations as shown in a location-recipe table 122. Accordingly, as the mobile communications device 102 approaches one of the locations of the table 122, the recipe server 116 may receive notification of the current location of the mobile communications device 102 and may look-up that location in the table 122 to find the appropriate recipe(s). The recipe(s) may then be transferred to the mobile communications device 102 for a timely construction and outputting of the relevant advertisement. For example, as the user of the mobile communications device 102 approaches three businesses 104, 106, 108, advertisement recipes that include content for those stores may be scheduled and the schedule of recipes may then be transferred to the mobile communications device 102 for timely implementation.

As an alternative to the recipe server 116 being connected through a mobile communications network, the recipe server 116 may instead be in communication via peer-to-peer or other short range communication methods where the recipes are being communicated from a system local to the merchant(s) where the device 102 is currently located. For example, the merchant 104 may have a local short-range transmission system so that as devices, such as the device 102, come into proximity, ad recipes and schedules pertinent to the merchant 104 are provided to the device 102 where advertisements can then be constructed and displayed in a timely manner.

Figure 2:
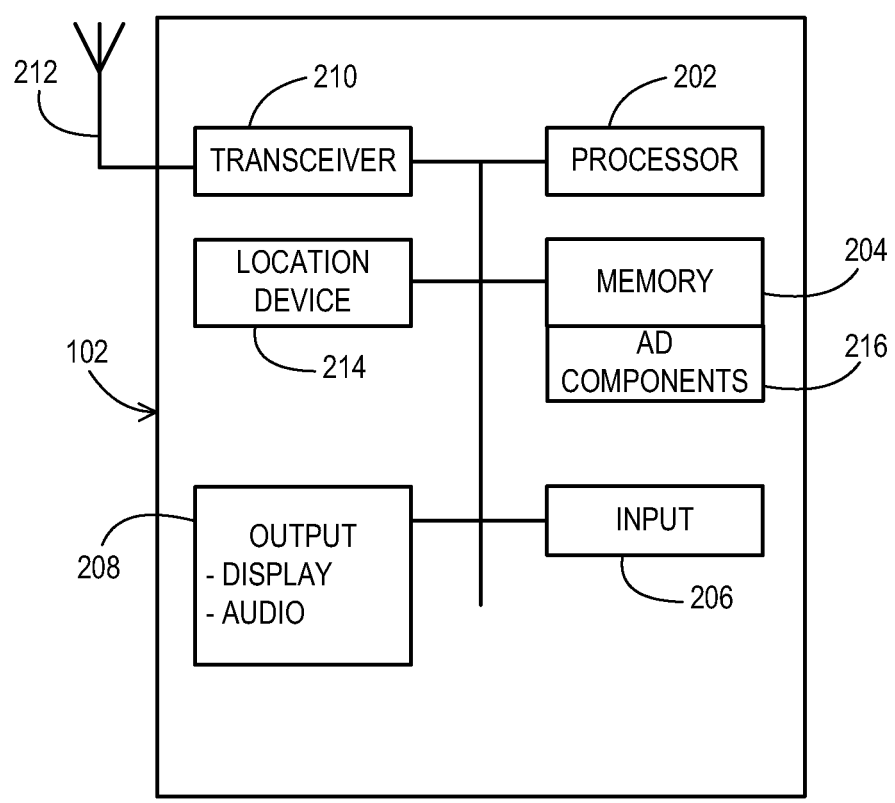
FIG. 2 shows one example of a mobile communications device.

FIG. 2 shows the components of one example of the mobile communications device 102 for outputting the advertisements. The mobile communications device 102 includes a processor 202, a memory 204, input device(s) 206, and output device(s) 208 such as a display device or other output such as an audio speaker. The mobile communications device 102 also includes a transceiver 210 with an antenna 212 for communicating with a wireless endpoint such as a cellular base station and/or directly via peer-to-peer communications with other mobile communications devices. Additionally, the mobile communications device 102 may include a location device 214, such as a geonavigational positioning system (GPS) receiver, a cellular signal triangulation receiver, and the like which detects the physical location of the mobile communications device 102 at virtually all times.

The processor 202 performs actions based on instructions either hard coded into the processor 202 or stored in the memory 204. An example of the logical operations performed arc is discussed below in relation to FIGS. 4A-4C. The processor 202 may be a dedicated/special purpose processor or a general purpose programmable processor or some combination. The memory 204 may be volatile memory, non-volatile memory, or a combination thereof. The processor 202 and/or memory 204 are examples of computer-readable media which store instructions that when performed implement various logical operations. Such computer readable media may include various storage media including electronic, magnetic, and optical storage.

According to exemplary embodiments, the memory 204 stores a set 216 of advertisement components that is received in advance of receiving the advertisement recipes. As previously discussed, these advertisement components may be loaded as defaults during manufacture of the mobile communications device 102 and/or may be received via data transfers from external devices such as the database 118 accessed through the mobile communications network. The processor 202 accesses necessary components from the set 216 as directed by an advertisement recipe.

The input device 206 may include a keypad, keyboard, touchscreen, voice recognized input, and so forth. The input device 206 provides data to the processor 202 which acts upon the input to perform requested tasks. The input device 206 may be used to cancel an advertisement being output and to manually trigger a download of updated advertisement components.

The output device 208 may include a display screen and/or audio output. The output device 208 may provide an interface allowing the user to make selections to cancel the current advertisement being output and/or to initiate the download of updated advertisement components.

Figure 3:
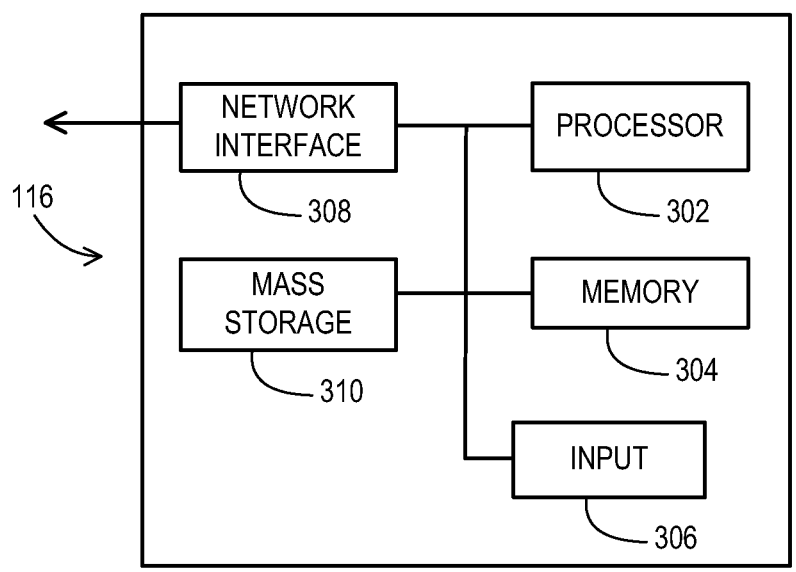
FIG. 3 shows one example of an advertisement recipe server.

FIG. 3 shows components of an example of the advertisement recipe server 116. The recipe server 116 may include the standard components of a server computer including a processor 302, memory 304, input/output devices 306, mass storage 310, and a network interface 308. The processor 302 communicates with external devices including the mobile communications device 102 via the network interface 308. According to exemplary embodiments, the processor 302 determines when advertising recipes and/or schedules of advertising recipes should be sent to a particular mobile communications device 102. Additionally, the processor 302 determines when updates to advertisement components should be sent to the particular mobile communications device 102. Examples of the logical operations performed by the processor are discussed below in relation to FIGS. 5A-C.

The memory 304 may be volatile or non-volatile or a combination thereof and may store instructions to be performed by the processor 302 when providing the advertisement service. As discussed above in relation to the mobile communications device 102, the processor 302 and the memory 304 are example of computer readable media.

The input/output 306 may be used for local operation and management of the advertisement recipe server 116. The input/output 306 may include a keyboard, mouse, display, and the like.

The mass storage device 310 may contain applications such as an operating system and an advertisement service application. Thus, the processor 302 may access the storage device 310 when implementing the advertisement service. The mass storage device 310 is another example of a computer readable medium.

The database 118 of FIG. 1 may be contained within the mass storage device 310. As an alternative, the database 118 may be present as network storage, accessible via the network interface 308.

Figure 4A:
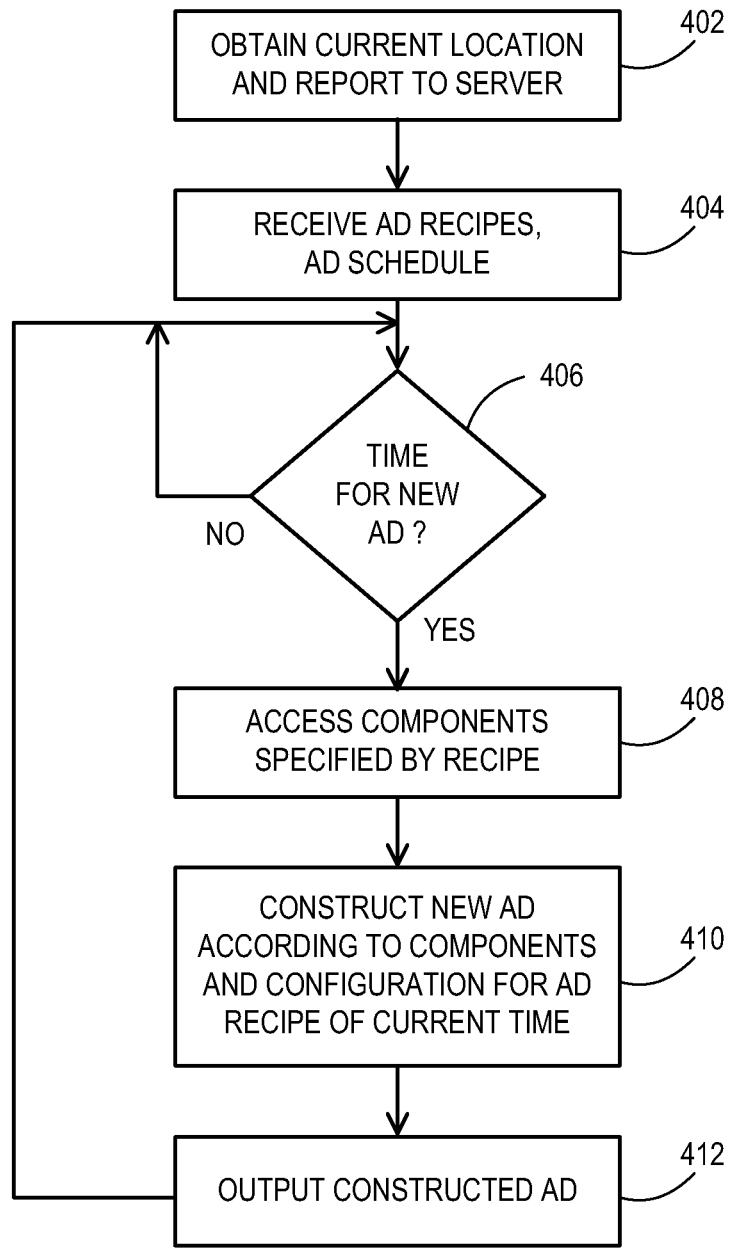
FIGS. 4A-C show examples of logical operations performed by a mobile communications device when obtaining advertisement components and constructing advertisements.

FIG. 4A shows one example of logical operations performed by the mobile communications device 102 to output advertisements to users. In this example, the mobile communications device 102 obtains its location via the location device 214 and reports this location to the mobile communications network, and hence to the advertisement recipe server 116, at location operation 402. In response to reporting the current location, the mobile communications device 102 then receives advertisement recipes and an advertisement schedule at reception operation 404. Because the location is being provided, the advertisement recipes and schedules that are returned may be location relevant. Of course, in other embodiments, the location may not be provided by the mobile communications device 102 but advertisement recipes and schedules may still be provided.

At query operation 406, the mobile communications device 102 detects whether the time for a new advertisement has occurred. The mobile communications device 102 may do so by referring to the schedule or by detecting whether an advertisement recipe has been received with an instruction to display immediately. Once it is determined that the time for a new advertisement has arrived, then the mobile communications device 102 accesses the needed advertisement components from memory at access operation 408. Then, the mobile communications device 102 constructs the advertisement from the advertisement components based on the configuration specified by the recipe at construction operation 410. The advertisement components, specified configuration, and resulting advertisement are discussed in more detail below with reference to FIG. 6.

Once the mobile communications device 102 has constructed the advertisement, the advertisement may then be outputted at output operation 412. As one example, the advertisement may be an audio advertisement where the output is audio through a speaker. As another example, the advertisement may instead be a visual advertisement where the output is a display on a display screen. Furthermore, the advertisement may be some combination of outputs.

While FIG. 4A shows the construction of the advertisement occurring only upon the determination that the time for outputting the advertisement has occurred, it will be appreciated that the timing of construction could be earlier. For example, the mobile communications device 102 may instead construct all of the advertisements specified in a given schedule that has been received and then queue the constructed advertisements for future outputting. This may be advantageous where the mobile communications device 102 has a very low performance processor so that periods of low usage of the processor 202 allows the processor to construct the advertisements in advance of their time for outputting. However, in this alternative, the amount of memory needed is increased in order to queue the constructed advertisements.

Figure 4B:
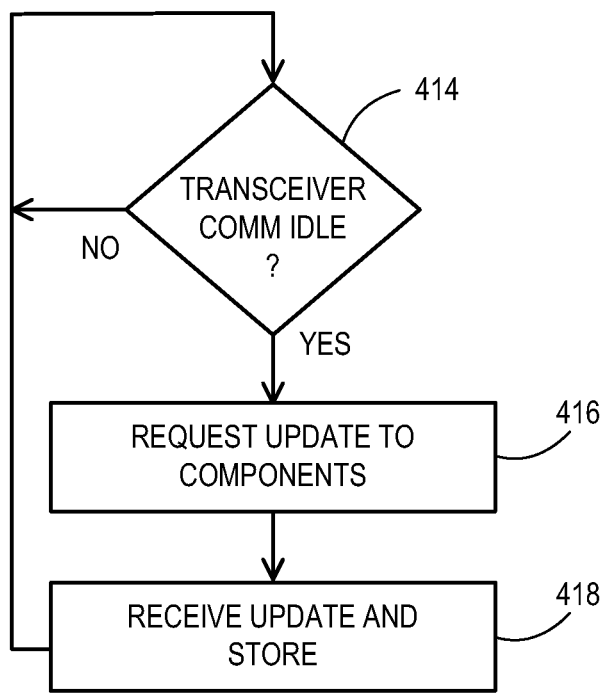

FIG. 4B shows one example of logical operations of the mobile communications device 102 for obtaining updates to the advertisement components. This set of logical operations presumes that the device 102 is initiating the update. The device 102 may initiate the update as a manual process whereby the user selects a menu option to update the components. Alternatively, the update may occur as an automatic process triggered by a set time or other condition for requesting updates being reached. Upon the time for requesting the update to occur, the mobile communications device 102 detects whether the transceiver communication has gone idle at query operation 414. If so, then the processor 202 transfers a request to obtain the update at request operation 416. The mobile communications device 102 then receives and stores the updates that are returned by the database 118 at storage operation 418.

Figure 4C:
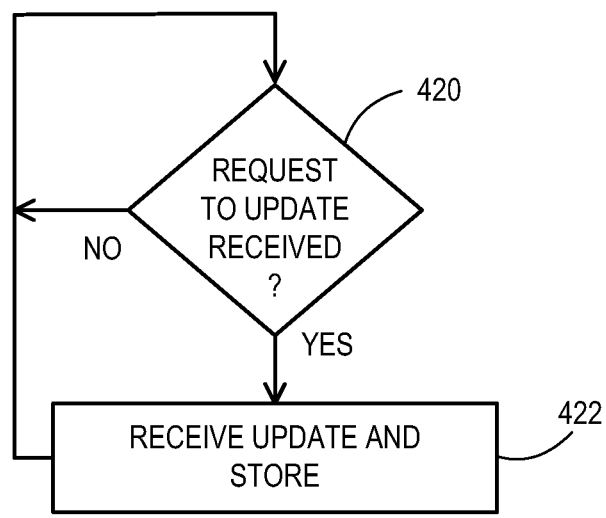

FIG. 4C shows another example of logical operations of the mobile communications device 102 for obtaining updates to the advertisement components. This set of logical operations presumes that the device 102 is not initiating the update but is instead being requested to accept an update by the database 118. At query operation 420, the mobile communications device 102 detects whether a request to accept an update has been received. Once the request has been received, then the mobile communications device 102 receives and stores the update at storage operation 422.

The advertisement recipe server 116 may maintain usage patterns of the mobile communications devices 102 and therefore be informed as to the period of time when the transceiver is likely to be idle. During this expected idle time, the advertisement recipe server 116 may then attempt sending the request to the mobile communications device 102 to accept the update.

Figure 5A:
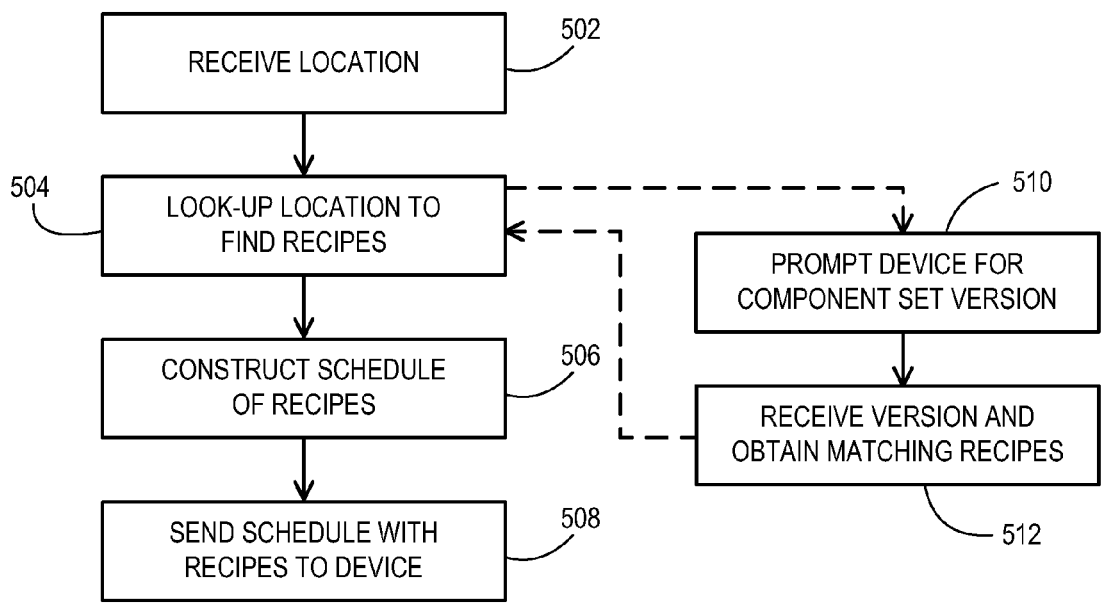
FIGS. 5A-C show examples of logical operations performed by an advertisement recipe server when providing advertisement components and advertisement recipes.

FIG. 5A shows an example of logical operations performed by the advertisement recipe server 116 to provide the advertisement recipes and schedules to the mobile communications devices 102. In this example, the recipe server 116 receives the location of each of the mobile communications devices 102 at location operation 502 in order to provide location relevant advertisement recipes and schedules. The recipe server 116 may then look-up the received location in the database 118 to find the relevant advertisement recipes at look-up operation 504.

According to various embodiments, the advertisement recipe server 116 may conduct additional queries to ensure that the mobile communications device 102 is adequately equipped to construct the advertisements specified by the advertisement recipe. For example, the mobile communications device 102 may maintain a version number for the set of advertisement components that are currently being stored. The recipe server 116 may then prompt the mobile communications device 102 for its recipe version at request operation 510 or may look-up the current version number for the mobile communications device 102 if the version number for the devices being served is maintained in the database 118. Where the recipe server 116 prompts for the version, then the response with the version number is received at reception operation 512.

Upon the recipe server 116 having determined the appropriate advertisement recipe(s) for the current mobile communications device 102 being served, then the recipe server 116 may construct a schedule of those advertisement recipes at construct operation 506. Constructing the schedule may be based on a current location or even a comparison of recent locations to infer a direction of travel. For example, the recipe server 116 may have a built-in geographical information service (GIS) or may access an external one to determine which businesses are nearby the current location, and the advertisement recipes may be chosen on the basis of those businesses with the schedule being set based on the distance of each business to the current location. Additionally, the past movements/location history of the mobile communications device 102 may be considered when setting the schedule, for instance in terms of the likelihood that the various nearby businesses will be visited or passed by the mobile device 102. This may be done to optimize the sequence of ads embodied in the schedule, the duration or one or more scheduled ads, and/or other aspects of the schedule. Furthermore, the schedule may specify a trigger such as time or location to cause an advertisement recipe of the schedule to become active. Additionally, where the direction of travel is known, then the advertisement recipes may be scheduled in the order that the various businesses or other locations will be encountered as the user continues to move in the current direction. Additionally, the schedule may be created without regard to location, such as by arbitrarily assigning an order and times for activation or by utilizing some other criteria such as when the user takes a particular action on the mobile communications device 102.

After constructing the schedule, the recipe server 116 then sends the schedule, if any, with the advertisement recipe(s) to the mobile communications device 102 at send operation 508. Because the amount of data needed to specify each advertisement recipe and the schedule itself is relatively small, the sending of the data may occur at the relevant time rather than waiting for a period of known or detected low activity of the mobile communications device 102 and/or mobile communications network in general. Accordingly, upon the user causing some triggering activity, such as entering a particular location that causes the recipe server 116 to begin finding advertisement recipes to send, the advertisement recipes may be delivered and implemented very quickly so that there is relatively little delay between the occurrence of the triggering activity and the outputting of the relevant advertisement.

Figure 5B:
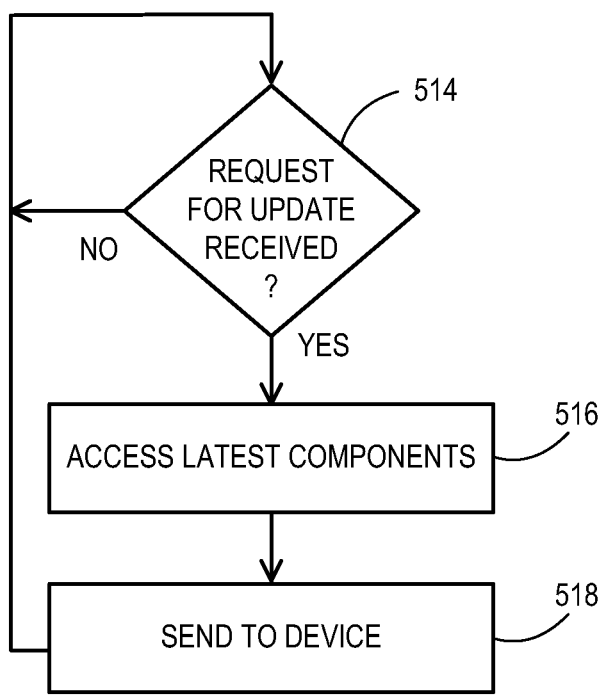

FIG. 5B shows an example of logical operations where the mobile communications device 102 requests that the advertisement components be updated. The recipe server 116 detects whether such a request has been received at query operation 514. If so, then the recipe server 116 accesses the latest components from database 118 at access operation 516. The recipe server 116 then sends those latest components to the mobile communications device at send operation 518. The recipe server 116 may send the new components down to the mobile communications device using a very low bandwidth upload speed from the recipe server so that bandwidth usage is not a concern. Furthermore, the recipe server 116 may stage the sending of the components so that it occurs during periods of expected or detected inactivity on the part of the mobile communications device.

Figure 5C:
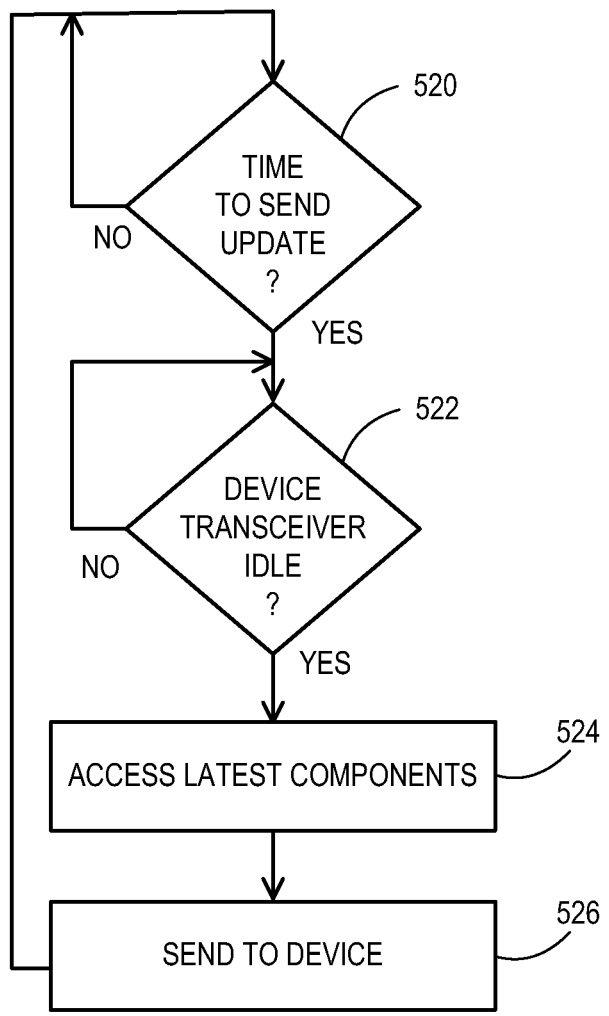

FIG. 5C shows an example of logical operations where the advertisement recipe server 116 initiates the updating of the advertisement components being stored by the mobile communications device 102. The recipe server 116 detects whether the time has come to send updated advertisement components to the mobile communications device at query operation 520. The recipe server 116 may make this determination by having a schedule for updating the mobile devices 102, by arbitrarily choosing a mobile device to be updated at a given time, and so forth. If it is determined to be time for an update, then the recipe server 116 may then detect whether the mobile communications device 102 is in an idle mode at detect operation 522, such as by querying the device or monitoring connectivity data specified by the base station 110. In order to minimize the impact on the mobile communications device 102, the recipe server 116 may be configured to force the updates upon the mobile communications device 102 only during these periods of inactivity. Once it is determined that the transceiver is idle, the recipe server 116 then accesses the latest components from the database 118 at access operation 524 and then sends them to the mobile communications device at send operation 526.

Figure 6:
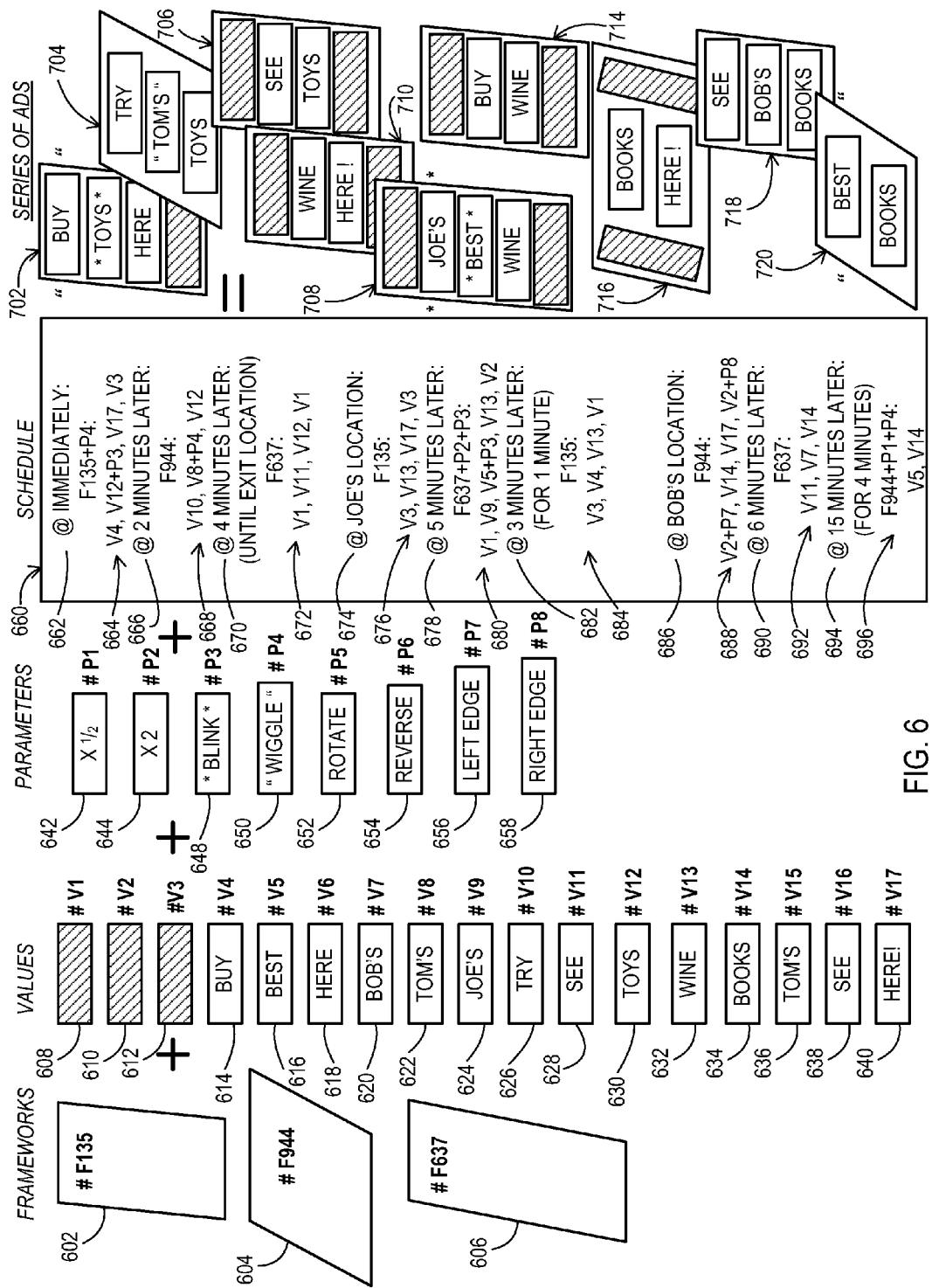
FIG. 6 shows an example set of components, recipes, schedules, and resulting advertisements.

FIG. 6 shows an example of a set of advertisement components, a schedule containing a set of advertisement recipes, and a resulting set of advertisements. The advertisement components of this example are for visual advertisements. The components include a set of frameworks 602-606, a set of values 608-640, and a set of parameters 642-658.

A schedule 660 specifies a timing for the advertisement recipes that are included. The advertisement recipes specify the frameworks, values, and parameters and the particular configuration of the values and parameters within the framework. A first timing data 662 specifies that a recipe 664 is to be constructed and displayed immediately. This recipe 664 may be requested for immediate display because the user is currently at the corresponding merchant location.

The recipe 664 specifies the needed components and configuration. Specifically, the recipe 664 calls for framework F135 which is the shape 602. Recipe 664 also calls for the parameter P4, which is the wiggle effect 650, to be added to the framework F135. The recipe 664 also calls for value V4, which is the block 614 containing the word "Buy" to be followed by the value V12, which is the block 630 containing the word "Toys." The recipe 664 further calls for the parameter P3, which is the blink effect 648, to be applied to the block 630. Additionally, following value V12, the recipe 664 calls for value V17, which is the block 640 containing the word "Toys." Finally, the recipe 664 calls for value V3, which is the block 612 that is a solid color, to follow value V17.

Upon combining the components as specified by the recipe 664, the mobile communications device 102 then immediately displays a resulting advertisement 702. The entire framework 602 wiggles while the block 630 blinks.

Timing information 666 specifies that two minutes after displaying the advertisement for the recipe 664, then construct and display the advertisement for the recipe 668. A resulting advertisement 704 associated with the recipe 668 is displayed at the appropriate time.

Timing information 670 specifies that four minutes after displaying the advertisement for recipe 668, construct and display the advertisement for the recipe 672. The timing information 670 further specifies that this advertisement is to be maintained until the user exits the current merchant location. A resulting advertisement 706 associated with the recipe 672 is then displayed.

Timing information 674 specifies that upon the user entering the next merchant's location, in this case "Joe's", construct and display the advertisement for the recipe 676. A resulting advertisement 708 associated with the recipe 676 is then displayed.

Timing information 678 specifies that five minutes after displaying the advertisement for the recipe 676, construct and display the advertisement for the recipe 680. A resulting advertisement 710 associated with the recipe 680 is then displayed.

Timing information 682 specifies that three minutes after displaying the advertisement for recipe 680, construct and display the advertisement for the recipe 684. The timing information 682 further specifies that this advertisement is to be maintained for one minute. A resulting advertisement 714 associated with the recipe 684 is then displayed.

Timing information 686 specifies that upon the user entering the next merchant's location, in this case "Bob's", construct and display the advertisement for the recipe 688. A resulting advertisement 716 associated with the recipe 688 is then displayed.

Timing information 690 specifies that six minutes after displaying the advertisement for the recipe 688, construct and display the advertisement for the recipe 692. A resulting advertisement 718 associated with the recipe 692 is then displayed.

Timing information 694 specifies that 15 minutes after displaying the advertisement for the recipe 692, construct and display the advertisement for the recipe 696. The timing information 694 further specifies that this advertisement is to be maintained for four minutes. A resulting advertisement 720 associated with the recipe 696 is then displayed.

Thus, an entire series of advertisements may be constructed from a set of components stored upon the mobile communications device 102 in advance of receiving the advertisement recipes. The recipes may then be quickly transferred to the device 102, such as at particularly relevant times based on the present context of the user, and the advertisements may be constructed and displayed promptly and according to a specified schedule. The user may then be provided with a relatively large number of advertisements created by mixing and matching from the pool of advertisement components.

While embodiments have been particularly shown and described, it will be understood by those skilled in the art that various other changes in the form and details may be made therein without departing from the spirit and scope of the invention.

What is claimed is:

1. A method of providing different advertisements at a mobile communications device that stores a plurality of advertisement components, comprising:
receiving at the mobile communications device at least some of the plurality of advertisement components via a mobile communications network while a user is using the mobile communication device, the advertisement components including frameworks, values, and parameters used to construct the different advertisements;
receiving at the mobile communications device different advertisement recipes, each advertisement recipe specifying a framework and a particular configuration of values and parameters within the framework, from among the components stored in the mobile communications device and received via the mobile communications network, to include in an advertisement, wherein the components that are stored in the mobile communications device are stored in advance of receipt of the advertisement recipes, and the components that are received via the mobile communications network are received in advance of the receipt of the advertisement recipes;
constructing at the mobile communications device the different advertisements from among the components stored in the mobile communications device in advance of the receipt of the advertisement recipes and the components received via the mobile communications network in advance of the receipt of the advertisement recipes, each advertisement being constructed from the framework and the particular configuration of values and parameters within the framework specified for the advertisement, according to the received different advertisement recipes; and
providing the different advertisements at the mobile communications device that correspond to the received different advertisement recipes.

2. The method of claim 1, further comprising displaying the different advertisements on the mobile communication device, wherein the framework specified in an advertisement recipe indicates a size and shape of the advertisement, the values specified in the advertisement recipe indicate the content to include in the advertisement, and the parameters specified in the advertisement recipe indicate effects to be applied to the framework and/or the parameters included in the advertisement, wherein the effects include at least one of size scaling, blinking, wiggling, rotating, and positioning.

3. The method of claim 1, wherein receiving the different advertisement recipes comprises receiving a schedule of different advertisement recipes, the schedule including the different advertisement recipes and a timing for each of the different advertisement recipes.

4. The method of claim 1, further comprising obtaining a location of the mobile communications device, wherein the advertisement recipes are based on the obtained location.

5. The method of claim 1, wherein receiving at least some of the plurality of advertisement components via the mobile communications network comprises receiving the plurality of advertisement components at different time periods while the mobile communications device is utilizing a percentage of the available communications bandwidth below a threshold.

6. The method of claim 1, further comprising receiving at least one additional advertisement component called for by an advertisement recipe when receiving the advertisement recipe.

7. The method of claim 1, wherein the advertisement recipes received by the mobile communications device are based on a user profile.

8. The method of claim 1, wherein the advertisement recipes received by the mobile communication device are based upon a version of the advertisement components stored by the mobile communications device.

9. The method of claim 1, wherein at least some of the components stored in the mobile communications device are default components stored in the mobile communications device during manufacture of the mobile communication device.

10. A non-transitory computer readable storage device containing instructions that, when executed by a processor, cause the processor to perform operations comprising:
   storing a plurality of advertisement components at a mobile communications device;
   receiving at the mobile communications device at least some of the plurality of advertisement components via a mobile communication network while a user is using the mobile telecommunications device, the advertisement components including frameworks, values, and parameters used to construct different advertisements;
   receiving at the mobile communications device different advertisement recipes from an external device, each advertisement recipe specifying a framework and a particular configuration of values and parameters within the framework, from among the components stored in the mobile communications device and received at the mobile communications device, to include in an advertisement, wherein the components that are stored in the mobile communications device are stored in advance of receipt of the advertisement recipes, and the components that are received via the mobile communications network are received in advance of the receipt of the advertisement recipes;
   constructing at the mobile communication device the different advertisements from among the components stored in the mobile communications device in advance of the receipt of the advertisement recipes and the components received via the mobile communications network in advance of the receipt of the advertisement recipes, each advertisement being constructed from the framework and the particular configuration of values and parameters within the framework specified for the advertisement, according to the received different advertisement recipes; and
   providing the different advertisements at the mobile communications device that correspond to the received different advertisement recipes.

11. The non-transitory computer readable storage device of claim 10, wherein the different advertisements are displayed and wherein the framework specified in an advertisement recipe indicates a size and shape of the advertisement, the values specified in the advertisement recipe indicate the content to include in the advertisement, and the parameters specified in the advertisement recipe indicate effects to be applied to the framework and/or parameters included in the advertisement, wherein the effects include at least one of size scaling, blinking, wiggling, rotating, and positioning.

12. The non-transitory computer readable storage device of claim 10, wherein receiving at the mobile communications device the different advertisement recipes comprises receiving a schedule of different advertisement recipes, the schedule including the different advertisement recipes and a timing for each of the different advertisement recipes.

13. The non-transitory computer readable storage device of claim 10, wherein the operations further comprise obtaining a location of the mobile communications device, wherein the received advertisement recipes are based on the obtained location.

14. The non-transitory computer readable storage device of claim 10, wherein receiving at least some of the plurality of advertisement components via the mobile communications network comprises receiving the plurality of advertisement components at different time periods while the mobile communications device is utilizing a percentage of the available communications bandwidth below a threshold.

15. A mobile communications device, comprising:
   a transceiver that communicates with a mobile communications network;
   a processor;
   an output device; and
   a memory storing a plurality of advertisement components and instructions which, when executed by the processor cause the processor to perform operations comprising;
   receiving at least some of the plurality of advertisement components via the transceiver while a user is using the mobile communications device, the advertisement components including frameworks, values, and parameters used to construct different advertisements;
   receiving different advertisement recipes via the transceiver each advertisement recipe specifying a framework and a particular configuration of values and parameters within the framework, from among the components stored in the memory and received via the transceiver, to include in an advertisement, wherein the components that are stored in the mobile communications device are stored in advance of receipt of the advertisement recipes, and the components that are received via the transceiver are received in advance of the receipt of the advertisement recipes;
   constructing the different advertisements from among the components stored in the mobile communications device in advance of the receipt of the advertisement recipes and the components received via the transceiver in advance of the receipt of the advertisement recipes, each advertisement being constructed from the framework and the particular configuration of values and parameters within the framework specified for the advertisement, according to the received different advertisement recipes; and
   providing the different advertisements to the output device.

16. The mobile communications device of claim 15, wherein the different advertisements are displayed and wherein the framework specified in an advertisement recipe indicates a size and shape of the advertisement, the values specified in the advertisement recipe indicate the content to include in the advertisement, and the parameters specified in the advertisement recipe indicate effects to be applied to the framework and/or the parameters included in the advertisement, wherein the effects include at least one of size scaling, blinking, wiggling, rotating, and positioning.

17. The mobile communications device of claim 15, wherein the processor receives a schedule of different advertisement recipes via the transceiver and wherein the processor outputs the different advertisements according to timing specified by the schedule.

18. The mobile communications device of claim 15, further comprising a location device, and wherein the processor obtains a current location of the mobile communications device from the location device and sends the current location to the mobile communications network via the transceiver such that the advertisement recipes received from the mobile communications network are based on the current location.

19. The mobile communications device of claim 15, wherein the processor receives at least some of the plurality of advertisement components via the mobile communications network at different time periods while the transceiver is utilizing a percentage of the available communications bandwidth below a threshold.

20. The mobile communications device of claim 15, wherein at least some of the components stored in the memory are default components stored in the mobile communications device during manufacture of the mobile communication device.

\* \* \* \* \*